Figure 1:
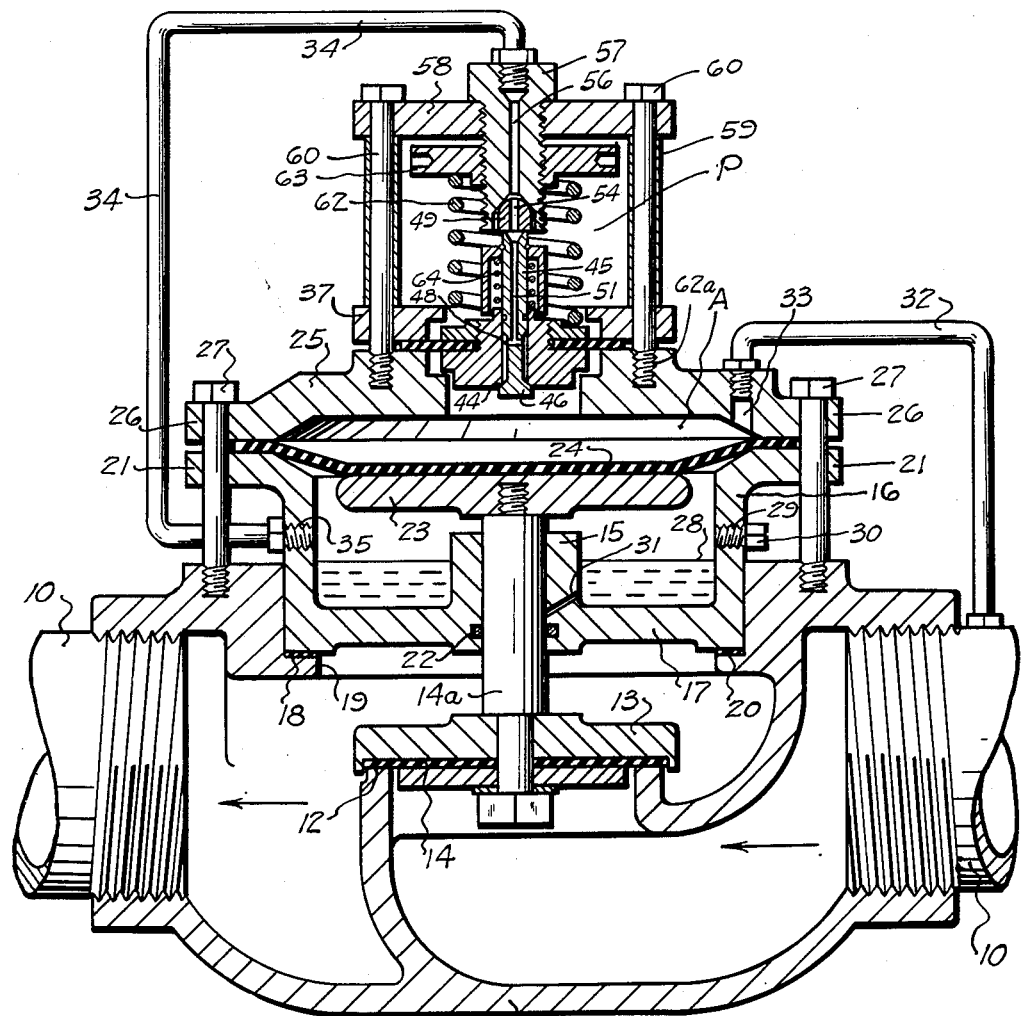

March 17, 1953 A. S. PARKS 2,631,606
PRESSURE REGULATOR
Filed Nov. 12, 1947 2 SHEETS—SHEET 1

Inventor
Asbury S. Parks

Joe E. Edwards
Attorney

March 17, 1953     A. S. PARKS     2,631,606
PRESSURE REGULATOR

Filed Nov. 12, 1947     2 SHEETS—SHEET 2

Inventor
Asbury S. Parks
Joe E. Edwards
Attorney

Patented Mar. 17, 1953

2,631,606

UNITED STATES PATENT OFFICE 2,631,606

PRESSURE REGULATOR

Asbury S. Parks, Houston, Tex.

Application November 12, 1947, Serial No. 785,277

20 Claims. (Cl. 137—489)

This invention relates to new and useful improvements in pressure regulating apparatus.

One object of the invention is to provide an improved pressure regulating apparatus which is extremely sensitive in operation and which will accurately control the fluid pressure within a line or conductor, said apparatus functioning efficiently under low pressure conditions.

An important object of the invention is to provide an improved pressure regulating apparatus which is controlled in its operation by the pressure in the upstream side of the line or conductor to which the device is applied, whereby the maintenance or regulation of the pressure flowing through the line is assured.

Another object of the invention is to provide an improved regulating apparatus wherein a full opening main valve in the pressure line or flow conductor is controlled by the operation of a pilot valve mechanism, with the latter being actuated in accordance with the upstream pressure in said line or conductor, whereby opening and closing of the main valve to regulate the pressure is effected solely in accordance with said upstream pressure.

A further object of the invention is to provide a regulating apparatus, of the character described, having a main valve for controlling flow through a flow conductor with said valve being opened and closed by a pressure-actuated member; the apparatus also including a pilot valve assembly which is operated by the upstream pressure in the flow conductor and which functions to balance or unbalance pressures across the pressure-actuated member, whereby the pressure within the flow conductor acting upon the main valve may open or close said valve depending upon whether the pressure across the pressure-actuated member is balanced or unbalanced.

Still another object of the invention is to provide an improved pilot valve assembly for a pressure regulating apparatus wherein said assembly functions to control the pressure acting upon the pressure-actuated member of said regulating apparatus to create either a balanced or unbalanced condition across the member and also wherein said assembly is so constructed that constant bleeding of the pilot pressure therefrom is not required which results in a conservation of the pilot pressure fluid; the assembly also functioning in a manner which does not cause the pilot pressure to vary in proportion to the variations occurring in the line pressure being regulated, whereby a more sensitive and efficient regulation or control of line pressure may be accomplished.

A particular object of the invention is to provide an improved pilot valve assembly for a pressure regulating apparatus having a stationary seat member and having a movable pilot valve element with the latter constructed in sections, whereby when the valve element is moved to a closed or seated position, the sections thereof may undergo movement with respect to each other to compensate for any misalignment which may occur to thereby assure proper sealing of the valve element at all times and to also eliminate undue wear or drag on the valve element or seat.

A further object of the invention is to provide an improved pressure regulating apparatus wherein a pressure-actuated member having connection with the main valve in the flow conductor has one side constantly exposed to the upstream pressure in said conductor, together with a pilot valve actuated by said upstream pressure for controlling the application of said upstream pressure to the opposite side of the pressure-actuated member, whereby when the upstream pressure reaches a predetermined point the pilot valve is actuated to balance or partially balance pressures across the pressure-actuated member and thereby permit opening of the main valve; reduction in the upstream pressure resulting in closing of the pilot valve to again allow unbalancing of the pressures acting on the pressure-actuated member to allow return of the main valve toward a closed position.

The construction designed to carry out the invention will be hereinafter described together with other features of the invention.

Figure 2:
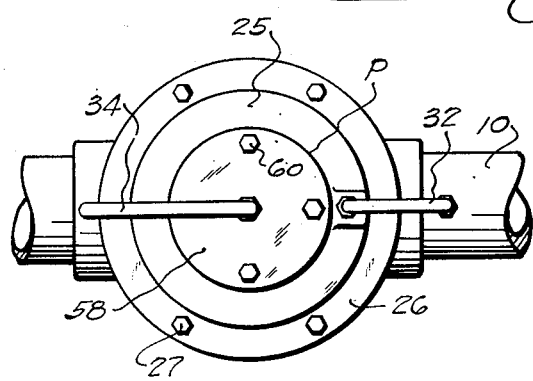
Figure 3:
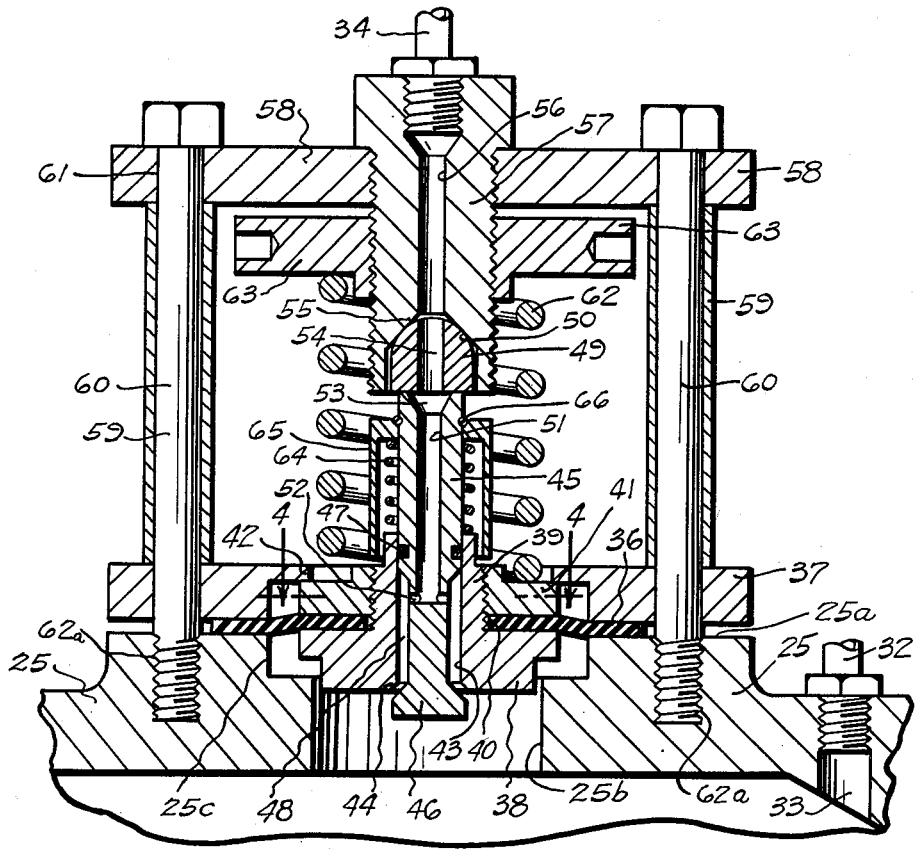
Figure 5:
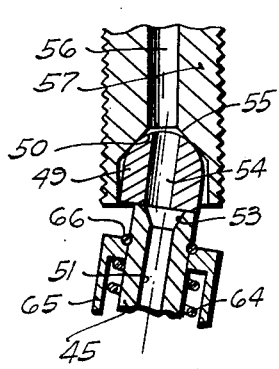
Figure 4:
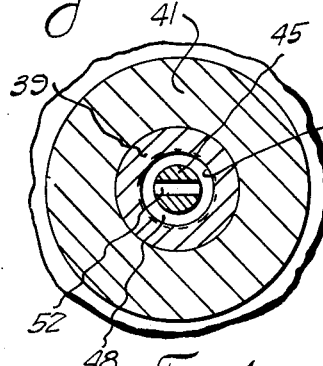
Figure 6:
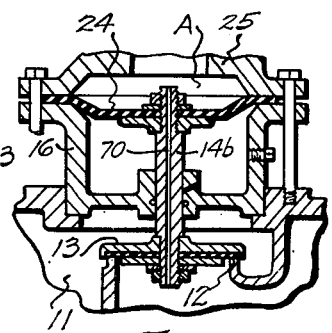

The invention will be more readily understood from a reading of the following specification and by reference to the accompanying drawing, wherein an example of the invention is shown, and wherein:

Figure 1 is a transverse, vertical, sectional view of a pressure regulating apparatus constructed in accordance with the invention, with the pilot valve in seated position, Figure 2 is a reduced plan view, Figure 3 is an enlarged, sectional view of the upper portion of the regulating apparatus with the pilot valve in an open or unseated position, Figure 4 is a horizontal, cross-sectional view taken on the line 4—4 of Figure 3, Figure 5 is an enlarged, sectional detail of the pilot valve and its seat, and Figure 6 is a reduced, sectional view illustrating a modification of the invention.

In the drawings, the numeral 10 designates a flow line or conductor through which the fluid, the pressure of which is to be regulated, flows. A control valve 11 is connected in the conductor 10 and includes an annular valve seat 12 which is located within the interior thereof. A main valve element 13 which is provided with a flexible sealing disk 14 is adapted to engage the seat 12 and when in a seated position, closes flow through the conductor. The valve element is secured to the lower end of a valve stem 14a which extends upwardly through an axial collar 15, which collar is formed integral with the central portion of a diaphragm housing or body 16. As is clearly shown in Figure 1, the diaphragm housing 16 is annular, being provided with a closed bottom 17, and seating on an annular shoulder 18 which is formed at the lower end of a central opening 19, the latter being formed within the upper portion of the housing of the valve 11. A suitable packing ring 20 is interposed between the body or housing 16 and the supporting shoulder 18. The upper portion of the housing is formed with an outwardly directed annular flange 21.

The valve stem 14a which extends upwardly through the collar 15 which is formed axially within the housing 16 is suitably sealed off by a packing ring 22 which surrounds said stem and which is located within an annular groove in the bore of the collar. The upper end of the stem 14a which projects above the collar 15 has a diaphragm supporting disk 23 secured thereto and this disk is located immediately below a flexible diaphragm 24. The marginal edge portions of the diaphragm 24 overlie and rest upon the annular flange 21 and a flanged closure or cap member 25 having an annular flange 26 is adapted to be secured to the flange 21 to firmly clamp the marginal edge of the diaphragm 24 between the flanges 21 and 26. Elongate bolts 27 which extend through the flanges 26 and 21 have their lower ends threaded into the housing of the valve 11 and obviously said bolts not only secure the diaphragm between the flanges 21 and 26 but also hold the diaphragm body 16 within the valve housing. It will be evident that the interior of the body 16 and the interior of the closure or cap member 25 form a diaphragm chamber A, within which the diaphragm 24 is movable. The lower portion of the chamber A is utilized as a reservoir for a lubricant 28 which may be introduced into the chamber through an opening 29 which is normally closed by a plug 30. This lubricant reservoir communicates with the bore of the collar 15 through an inclined passage 31 which extends radially through the collar. The lubricant 28 flowing through the inclined passage 31 functions to maintain the packing ring 22 lubricated at all times so as to assure an efficient seal at this point.

It will be evident that the cross-sectional area of the main operating diaphragm 24 is larger than the cross-sectional area of the valve element 13 and, therefore, if the same pressure is acting on the upper surface of the diaphragm as is acting on the underside of the valve, the valve element would be urged and maintained in a seated or closed position. If pressures across the diaphragm 24 are equalized, then the pressure acting beneath the valve element 13 could function to raise or lift said element to unseat the same and thereby permit a flow past the valve seat 12 and through the conductor 10.

For controlling the pressures acting on the diaphragm 24 to permit opening and closing of the main valve to properly regulate the pressure in the flow conductor, the upper surface of the diaphragm 24 is exposed to the upstream pressure within the flow conductor 10 through a suitable line or pipe 32. As is clearly shown in Figure 1, the line 32 extends from the conductor 10 and connects into an opening 33 which communicates with the diaphragm chamber A above the diaphragm 24. With this arrangement, the upstream pressure which as acting on the underside of the main valve element 13 tending to open said valve is also conducted to the upper end of the diaphragm 24 and because the area of said diaphragm is larger than that of the valve element, the diaphragm will tend to hold the valve in its seated position. In order to permit opening of the valve, it is necessary that the pressures across the diaphragm, that is, pressures acting above and below said diaphragm, be equalized or partially so, and when this is done, the upstream pressure acting against the underside of the valve element will move the same to an open position.

The balancing of pressures across the main diaphragm must occur to open the main valve when the upstream pressure rises above the pressure which is to be maintained in the conductor 10 and to effect this result, a pilot valve assembly generally indicated at P is provided. This assembly is arranged to control the flow from the upper end of the diaphragm chamber A to a conductor or pipe 34 which has one end connected in an opening 35 which communicates with the diaphragm chamber A below the diaphragm 24. When the pilot valve P is open the upstream pressure which is present in the chamber A above the diaphragm may pass through the conductor 34 to the chamber below the diaphragm and when this occurs, pressures across the diaphragm 24 are balanced or partially balanced, with the result that the upstream pressure acting on the underside of the valve 13, may move said valve to its open position. Closing of the pilot valve P will allow a bleeding off of the pressure from the chamber below the diaphragm 24, as will be explained, so that the upstream pressure acting upon the greater area of the diaphragm 24 may again close the valve.

The pilot valve assembly P is shown in detail in Figure 3 and includes an operating diaphragm 36 which has its marginal edge portion supported upon the upper surface 25a of the closure member and suitably clamped to said surface by an annular retaining ring 37. The closure or cap member 25 has an axial or central opening 25b which opening is counter bored at 25c. A valve seat block 38 having an upstanding annular extension 39 has its extension projecting through a central opening 40 formed in the diaphragm 36 and said diaphragm is clamped to the block by a collar 41 which is threaded onto the extension 39. In this manner, the valve block 38, diaphragm 36 and clamping collar 41 are all movable axially of the closure member 25. The retaining ring 37 which clamps the pilot diaphragm 36 to the closure member has an inwardly extending flange 42 which overlies the clamping collar 41 and axial movement of the block, diaphragm and collar are restricted by the flange 42 on the upper movement and by the shoulder formed between the bore 25b and the counter bore 25c on the lower movement.

The valve block 38 is provided with an axial bore 43 which has an annular valve seat 44 at its lower end. A valve plunger 45 having a valve head 46 at its lower end is movable longitudinally within the bore 43 and the joint between the plunger and bore is sealed by a suitable annular packing ring 47. The lower end of the plunger 45 is reduced to provide an annular passage 48 between the external surface of the plunger and the bore 43. The upper end of the plunger extends outwardly from the bore 43 a considerable distance and the top of the plunger engages a valve head 49 which has its upper surface semi-spherical or rounded as indicated at 50. The plunger is formed with an axial bore 51 which extends downwardly from the upper end of said plunger and which has its lower end terminating in communication with radial passages or ports 52. The upper end of the bore is flared outwardly as shown at 53. The valve head 49 has an axial bore 54 extending entirely therethrough and when the flat upper surface of the plunger is in engagement with the flat lower surface of the valve head, the bore 54 of said head communicates with the bore 51 of the plunger.

The valve head 49 is adapted to engage an annular valve seat 55 which is formed at the lower end of an axial bore 56 which extends through an elongate sleeve 57. The sleeve 57 is threaded and supported within a supporting plate 58 and said plate rests upon tubular spacers 59 which surround elongate bolts 60. The bolts pass through openings 61 in the marginal portions of the plate 58 and have their lower ends extending through the retaining ring 37 and threaded into openings 62a in the closure or cap member 25. It will be evident that the bolts 60 function to firmly clamp the pilot diaphragm 36 in position and through the spacers 59 support the plate 58 within which the sleeve 57 is mounted. The conductor 34 which has one end communicating with the underside of the main operating diaphragm 24 is suitably coupled into the upper end of the sleeve 57, whereby said conductor communicates with the bore 56 of said sleeve.

From the foregoing it will be seen that when the valve plunger 45 is in a lowered position with respect to the seat 44, as shown in Figure 3, the flow may occur from the upper end of the diaphragm chamber A, through the annular passage 48 around the reduced portion of the plunger 45, then through ports 52 and bore 51 in said plunger, through bore 54 of the valve head 49 and through the bore 56 of the sleeve 57 and finally into the conductor 34. From the conductor, the flow may be into the diaphragm chamber beneath the main diaphragm 24. Therefore, when the valve plunger 45 is in an unseated or opened position, communication is established between the area above the diaphragm 24 and the area below said diaphragm, whereby the pressures acting on opposite sides of said diaphragm may become equalized.

In order to adjust the pilot valve to open under predetermined pressure conditions, as will be explained, a main spring 62 surrounds the valve plunger 45 and sleeve 57 and has its lower end resting upon the retaining collar 41 of the pilot diaphragm assembly. The upper end of the spring 62 is engaged beneath an adjusting nut 63 which is threaded onto the exterior of the sleeve 57 and obviously by adjusting the nut, the pressure of the spring 62 may be varied. The spring constantly exerts its pressure to urge the pilot diaphragm 36 downwardly which urges the valve seat 44 into engagement with the valve head 46 of the valve plunger. Thus, the pressure of the spring 62 constantly urges the pilot valve to its closed position. A light spring 64 surrounds the valve plunger 45 and has its lower end resting upon the upper end of the extension 39 of the valve block. The upper end of the spring engages a sleeve 65 which surrounds the plunger and which is confined against upward movement with respect to the plunger by a retaining ring 66. This light spring exerts its pressure to urge the valve plunger 45 upwardly with respect to the valve seat 44 and also tends to maintain the valve head 46 in a seated position. The purpose of the light spring is to cause the valve block 38 and valve plunger 45 to move as a unit until such time as the greater strength of the main spring 62 is overcome.

In the operation of the device assuming that it is desired to maintain a pressure of ten pounds per square inch on the upstream side of the flow conductor, the main pilot valve spring 62 is adjusted so that when the pressure in the upstream side of the flow conductor and therefore in the upper portion of the chamber A exceeds ten pounds per square inch, the pilot diaphragm 36 begins to move upwardly. With the upstream pressure below the assumed desired pressure of ten pounds per square inch, the parts are in the position shown in Figure 1. This position, the pilot valve diaphragm is in a lowered position with the valve seat 44 engaging the valve head 46 whereby a flow from the diaphragm chamber A to the conductor 34 is shut off. At this time any pressure in the conductor 34 may be bled off past the valve head 49 which is not held in tight sealing engagement with its seat 55 when the parts are in the position shown in Figure 1. Thus, the pressure below the main operating diaphragm 24 may bleed off so that the upstream pressure acting against the upper side of the diaphragm 24 holds the valve stem and main valve element 13 in its lowered position.

The parts remain in this position until the upstream pressure in the conductor 10 exceeds the assumed desired pressure of ten pounds per square inch. When this occurs, the pressure builds up in the chamber A above the main diaphragm 24 and below the pilot diaphragm 36. As the pilot diaphragm 36 begins its upward movement against tension of the main spring 62, the light spring 64 which is tending to hold the valve plunger 45 seated causes said valve plunger to urge its upper end into a tight seating engagement with the underside of the valve head 49 and also forces the semi-spherical upper portion of the valve head into tight engagement with its seat 55. Continued upward movement of the pilot diaphrgam by the increased pressure causes the block 38 which carries the valve seat 44 to move upwardly out of engagement with the valve head 46 and as soon as this occurs, a communication is established between the upper end of the diaphragm chamber A above the main diaphragm 24 and the underside of said main diaphragm. As has been explained, this communication is through the annular space 48 between the lower end of the valve plunger 45 and the bore 43, then through ports 52, bore 51, bore 54 of valve head 49, bore 56 of the sleeve 57 and through the conductor 34. As soon as this communication is established the upstream pressure which is normally acting only on the upper surface of the main diaphragm 24 is conducted to the underside of said diaphragm, whereby pressure conditions across said diaphragm are balanced or partially balanced. The balancing of the pressures acting on opposite sides of the main diaphragm permit the upstream pressure which is acting on the underside of the main valve element 13 to open said main valve element and allow a flow past the valve seat 12.

An important feature of the present invention lies in the construction of the pilot valve which comprises the plunger 45, valve head 49 and sleeve 57. As has been stated, the pilot diaphragm 37 is full floating and is made so because the ends of a spring, such as the spring 62 are never square under load. This allows cocking or axial misalignment of the pilot valve with respect to the seat 55 but by provision of the interposed valve head 49 a positive seal without undue wear is obtained. As the diaphragm moves upwardly against the tension of the spring 62, the valve plunger will undergo a slight axial misalignment with respect to the valve member 49. This misalignment is illustrated in Figure 5 but because the flat upper end of the plunger 45 is engaging the flat underside of the valve head 49 and also because the upper end of the valve head is semi-spherical, the seats between these parts will be maintained under misalignment conditions. Therefore, during upward movement of the pilot diaphragm, the valve plunger 45 and the valve head 49 will maintain a tight seal at their points of contact and also at the point of contact between the valve head and its seat 55. The provision of the valve member with its particular co-action and mounting with respect to the plunger 45 also prevents the valve head from riding hard on one side of its seat with the result that drag, as well as excessive wear is eliminated.

So long as the pressure conditions across the diaphragm are balanced or partially balanced, the main valve 13 will remain open. The balanced condition across the main operating diaphragm will be maintained until the upstream presure drops below that for which the pilot valve spring 62 is adjusted. As soon as this upstream pressure which is within the upper portion of the diaphragm chamber A drops below the predetermined pressure for which the spring is adjusted, the diaphragm 36 will move downwardly. As the diaphragm 36 begins its downward movement the light spring 64 will bring the valve head 46 of the plunger to a position engaging the seat 44, and from this point on the entire assembly which includes the diaphragm and valve plunger will move as a unit. The continued downward movement caused by the declining pressure below the pilot diaphragm will decrease the force which is holding the valve plunger 45 against the valve member and the valve member against its seat 55. Reduction in this force allows a leakage at the joints formed between these members and therefore the pressure which is present in the diaphragm chamber A below the main diaphragm 24 may bleed back through the conductor 34 and outwardly through these joints. This results in a decrease in pressure below the diaphragm 24 so that the upstream pressure which is acting above the diaphragm 24 can again move the valve 13 to its seat. The parts will remain in this position until the upstream pressure again increases to the point which will operate the pilot valve and again balance or partially balance pressures across the main diaphragm 24.

It is noted that the foregoing description sets forth the extreme positions of the main valve, that is, from closed or seated to open; in actual operation, the pressures on either side of the main diaphragm 24 will be partially balanced and the exact degree of balance will be in accordance with the upstream pressure so that a throttling flow through the main valve will be produced. It will be evident that any increase in line pressure acts on the pilot diaphragm to admit the line pressure beneath the main diaphragm 24 and as soon as this pressure acts against the underside of the latter, a partial balancing across the same is effected to partially open the main valve. When the main valve is open to the extent that the line pressure starts to decline, the force acting on the pilot diaphragm 36 begins to decline, thereby allowing the spring 62 to urge the diaphragm downwardly. This allows the spring 64 to move the valve 46 to a seated position to shut off further flow of pressure to the underside of the main diaphragm. Any further drop in line pressure decreases the force holding the various parts 45, 49 and 57 together to allow leakage at their joints to reduce the pressure below the main diaphragm and thereby allow the same to move the main valve toward a closed position. Of course, as soon as the main valve begins to move toward a closed position, the line pressure is instantaneously increased and this increased pressure acting on the pilot diaphragm forces the various parts of the pilot back into tight sealing position and if the increase continues, the valve element 46 again opens. Thus, the degree of balance across the main diaphragm is controlled in accordance with the upstream pressure and the main valve is throttled to accurately regulate said upstream pressure.

It is pointed out that the pilot valve assembly P is not a constant bleeding type; as is well known, a pilot of the constant bleeding type acts to partially or totally close the port carrying pilot gas either to or from a motor valve diaphragm so that the pressure on the diaphragm at any time depends on the degree of throttling of the port. Thus, the constant bleeding type of pilot is merely the controlling of a constantly flowing pilot gas stream and once the flow of the pilot gas has reached equilibrium for any given throttling condition there can be no further change in diaphragm pressure regardless of the amount that the line pressure varies from that desired. It is also obvious that in this type of pilot, a relatively large waste of pilot fluid results.

The pilot valve illustrated does not function to change the pilot pressure a given amount that is proportional to the change in pressure in the flow conductor. When the upstream pressure changes sufficiently to either open or close the pilot P, pilot pressure changes either up or down until the main valve moves to correct the pressure difference. In actual operation, a balanced or partially balanced condition is maintained across the main valve diaphragm, with the degree of balance varying with up-stream pressure to give a throttling flow through the main valve.

The pilot assembly is also arranged to compensate for the inherent disadvantages of a spring and as has been noted compensates for the misalignment which will occur in the valve plunger. The device is controlled in its operation solely in accordance with the upstream pressure in the flow conductor, said upstream pressure not only functioning to control opening and closing of the main valve but also acting to control operation of the pilot valve. The lubricant reservoir which is formed in the lower portion of the diaphragm chamber A is important since it functions to properly lubricate the packing ring 22 to assure an efficient seal around the valve stem.

In Figures 1 to 5, the upstream pressure has been illustrated as conducted to the upper end of the diaphragm chamber A by means of the conductor 32. However, this pressure could be directed to the upper end of said chamber by other means and in Figure 6 a slight modification has been illustrated. In this figure the conductor 32 is completely eliminated and in lieu thereof a valve stem 14b is substituted for the valve stem 14a. The valve stem 14b has an axial passage 70 which extends entirely therethrough and which establishes communication between the area below the main valve 13 and the area above the main operating diaphragm 24. The parts above the closure member 25 are not illustrated in Figure 6 but are of an identical construction to the arrangement shown in Figure 1. It will be evident that the device will function in exactly the same manner as has been described, with the upstream pressure being directed to the area above the operating diaphragm 24 through the passage 70, rather than through the external conductor 32.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. As a sub-combination in a pressure regulating apparatus, a pilot valve mechanism including a pressure chamber, a pressure responsive member mounted in said chamber and exposed to the pressure therein, a valve plunger mounted axially of the member and having the member movable independently thereof to seated and unseated positions relative thereto, said plunger having a flow passage therein adapted to communicate with the interior of the pressure chamber when the plunger is in an unseated position, a conducting means having a valve seat therein communicating with said flow passage, and valve means on said plunger and pressure-responsive member for opening and closing said flow passage in accordance with the movement of the member as controlled by the pressure acting thereon, said plunger engaging the valve seat of the conducting means to close flow past the valve seat in the conducting means when the valve means is open, whereby a leak-proof passage for flow from the flow passage in the plunger to the conducting means is provided.

2. As a sub-combination in a pressure regulating apparatus, a pilot valve mechanism, including a pressure chamber, a pressure-responsive member mounted in said chamber and exposed to the pressure therein, a valve plunger mounted axially of the member and having the member movable independently thereof to seated and unseated positions relative thereto, said plunger having a flow passage therein adapted to communicate with the interior of the pressure chamber when the plunger is in an unseated position, a conducting means having a valve seat therein communicating with said flow passage, valve means on said plunger and pressure-responsive member for opening and closing said flow passage in accordance with the movement of the member as controlled by the pressure acting thereon, said plunger engaging the valve seat of the conducting means to close the flow past the valve seat in the conducting means when the valve means is open, whereby a leak-proof passage for flow from the flow passage in the plunger to the conducting means is provided, and means interposed between the plunger and the valve seat in the conducting means for compensating for any axial misalignment of said plunger and seat, whereby a positive and efficient seal is assured.

3. As a sub-combination in a pressure regulating apparatus, a pilot valve mechanism, including a pressure chamber, a pressure responsive member mounted in said chamber and exposed to the pressure therein, a valve plunger mounted axially of the member and having the member movable independently thereof to seated and unseated positions relative thereto, said plunger having a flow passage therein adapted to communicate with the interior of the pressure chamber when the plunger is in an unseated position, a conducting means having a valve seat therein communicating with said flow passage, and valve means on said plunger and pressure-responsive member for opening and closing said flow passage in accordance with the movement of the member as controlled by the pressure acting thereon, and a valve head interposed between the plunger and seat and having a curved surface for engaging the valve seat and a flat surface for engaging the flat end of the plunger, said plunger, head and seat engaging each other in leak-proof joints when the pressure-responsive member has been moved to open the valve means associated with said member and plunger, whereby flow from the chamber to the conducting means may occur, said valve head automatically compensating for any axial misalignment of the plunger and valve seat which may occur when the pressure-responsive member is moved by the pressure acting thereon to assure efficient sealing at the joints between said plunger, head and seat.

4. The sub-combination as set forth in claim 3, together with adjustable resilient means acting on the pressure-responsive member to control the amount of pressure which must be present in the pressure chamber to impart movement to the member.

5. A pressure regulating apparatus for regulating the pressure of a fluid within a flow conductor including, a main valve element connected in said flow conductor for controlling flow therethrough, a pressure-responsive member connected with the main valve element and movable in accordance with pressures acting on opposite sides thereof for controlling operation of said valve element, means for conducting the pressure from the flow conductor to one side of the pressure-responsive member, means for establishing communication between opposite sides of said pressure-responsive means and having valve means therein for controlling flow therethrough in a direction from one side of the member to the opposite side thereof, said valve means being actuated by the variations in the pressure in the flow conductor whereby when the pressure in said conductor is at a predetermined selected point the valve means is opened to allow balancing or partial balancing of pressures on opposite sides of the pressure-responsive member to actuate the main flow conductor valve, a second valve means in the communication-establishing means for controlling flow from one side of the pressure-responsive member to the atmosphere, and means responsive to pressure in the flow conductor when said pressure varies by a predetermined amount in an opposite direction from the pressure which actuates the first valve means for actuating the second valve means.

6. An apparatus as set forth in claim 5, wherein the first-named valve means in the communicating means is opened only when the second valve means therein is closed and the second valve means opens only when the first-named valve means closes.

7. A pressure regulating apparatus for regulating the pressure of a fluid within a flow line including, a main valve element connected in said flow line for controlling flow therethrough, said valve element having one side exposed to the pressure in the upstream side of the flow line whereby said pressure constantly urges the valve element toward an open position, a pressure-responsive member connected with the valve element and having an area larger than the area of the valve element with one side thereof constantly exposed to the upstream pressure in the flow line, whereby the valve element is held in a closed position by said member, conducting means establishing communication between opposite sides of the pressure-responsive member, means responsive to and actuated by the pressure in the flow line when said pressure is at a predetermined selected point for permitting a flow through the conducting means to expose both sides of the pressure-responsive member to the flow line pressure and thereby substantially equalize pressures across said member, whereby the main valve element is operated by the flow line pressure acting thereon, and a normally closed vent valve in the conducting means also actuated by the flow conductor pressure for venting the pressure acting on one side of the pressure-responsive member, and means responsive to flow line pressure having connection with the vent valve and opening said vent valve when the flow line pressure has been varied a predetermined amount by the previous operation of the main valve element, whereby the main valve element is again actuated to control the pressure in the flow conductor.

8. A pressure regulating apparatus for regulating the pressure of a fluid within a flow conductor including, a main valve element connected in the flow conductor for controlling flow therethrough, a pressure responsive member connected with the main valve element and movable in accordance with pressures acting on opposite sides thereof for controlling operation of said valve element, one side of said pressure responsive member being exposed to the same pressure at all times, means for establishing communication between the flow conductor and that side of the pressure responsive member opposite the side exposed to the same pressure at all times, valve means in the communication-establishing means, a valve-operating member having the valve means directly attached to the central portion thereof, said valve-operating member being responsive to and operable by the pressure fluid in the conductor when the pressure thereof reaches a predetermined selected point in one direction to actuate the valve means and direct the fluid from the conductor through the communicating means to that side of the pressure responsive member opposite the side exposed to the same pressure at all times to thereby vary the pressure conditions across the member to operate the valve element, said valve means upon operation remaining open to maintain application of the flow conductor pressure to said pressure responsive member until the flow conductor pressure varies in an opposite direction from the predetermined selected point which initially operated said valve means, and a second valve means which is also controlled by the valve-operating member which is responsive to and actuated by the fluid pressure in the fluid conductor when said fluid pressure reaches a predetermined pressure different from the pressure which operates the first valve means to vent the pressure from that side of the member to which pressure fluid was previously conducted by operation of the first valve means, whereby pressure conditions across the valve member are again varied to actuate the valve element in an opposite direction.

9. A pressure regulating apparatus as set forth in claim 8, wherein the second valve means is closed when the first valve means is open and similarly the first valve means is closed when the second valve is open.

10. A pressure regulating apparatus as set forth in claim 8, wherein the area of the pressure responsive member is greater than the area of the valve element and also wherein the valve element is exposed to the pressure in the flow conductor, whereby balancing and unbalancing of pressures across the pressure responsive member permits the pressure in the flow conductor acting upon the valve element to enter into the operation of said valve.

11. A pressure regulating apparatus for regulating the pressure of a fluid within a flow conductor including, a main valve element connected in the flow conductor for controlling flow therethrough, a housing, a pressure responsive member mounted within the housing and connected with the main valve element and movable in accordance with pressures acting on opposite sides thereof for controlling operation of said valve element, one side of said pressure responsive member being exposed to the same pressure at all times, means for establishing communication between the flow conductor and that side of the pressure responsive member opposite the side exposed to the same pressure at all times, a valve means located in the upper portion of the housing above the pressure responsive member and disposed in the communication-establishing means for controlling flow of the pressure fluid from the conductor to that side of the pressure responsive member opposite to the side exposed to the same pressure at all times, a second valve mans also disposed in the communication-establishing means for venting to atmosphere that side of the pressure responsive member to which fluid pressure may be directed past the first valve means, a pressure responsive actuator common to both valve means and exposed to the fluid pressure in the conductor and actuated by variations in said pressure, means for connecting the actuator to both valve means to maintain both valve means closed when the pressure fluid within the conductor is within a predetermined selected pressure range, said actuator opening the first valve means when the pressure of the fluid in the conductor deviates from the selected pressure range in one direction and holding said valve means open to continuously direct pressure fluid to the pressure responsive member so long as the pressure remains outside the selected pressure range, said actuator opening the second valve means when the pressure deviates from the selected range in a direction opposite to the direction of deviation which operated the first valve means.

12. A pressure regulating apparatus as set forth in claim 11, together with means associated with the pressure responsive actuator for setting the pressure range within which both valve means are maintained in a closed position by said actuator.

13. A pressure regulating apparatus for regulating the pressure of a fluid within a flow conductor including, a main valve element connected in said flow conductor for controlling flow therethrough, a pressure-responsive operating member connected with the main valve element and movable in accordance with pressures acting on opposite sides thereof for controlling operation of said valve element, means for conducting pressure from the upstream side of the flow conductor to opposite sides of the pressure-responsive member, a control means actuated by said upstream pressure for balancing pressures across the pressure-responsive member when the upstream pressure exceeds a predetermined pressure and for unbalancing the pressures across said pressure-responsive member when the upstream pressure falls below a predetermined point, whereby the main valve element is actuated in accordance with the balancing and unbalancing of the pressures thereacross, said means for balancing and unbalancing the pressures across the pressure-responsive member including a valve for venting the pressure acting upon one side of the pressure-responsive member, and a control diaphragm exposed to and operated by the upstream pressure and associated with the vent valve, said control diaphragm closing the vent valve when the upstream pressure is above a predetermined point and opening said vent valve only when said upstream pressure falls below a predetermined point.

14. A pressure regulating apparatus for regulating the pressure of a fluid within a flow conductor including, a main valve element connected in said flow conductor for controlling flow therethrough, a pressure-responsive member connected with the main valve element and movable in accordance with pressures acting on opposite sides thereof for controlling operation of said valve element, means for conducting the pressure from the upstream side of the flow conductor to one side of the pressure-responsive member, whereby said member functions to maintain the valve element in a closed position, means for establishing communication between the upstream pressure in the flow conductor and the opposite side of the pressure-responsive means, a pilot valve assembly mounted in said communicating means controlling flow through said means and movable to two positions, said pilot valve assembly when in one position partially balancing the pressures across the pressure-responsive member and when in its second position unbalancing the pressures across the pressure-responsive member, the pilot valve assembly including a normally closed vent valve for venting the pressure acting on one side of the pressure-responsive member and a diaphragm exposed to and operated by the upstream pressure and associated with the vent valve for opening said vent valve when the pilot valve assembly is in its second position and the upstream pressure falls below a predetermined point.

15. A pressure regulating apparatus for regulating the pressure of a fluid within a flow line including, a main valve element connected in said flow line for controlling flow therethrough, said valve element having one side exposed to the pressure in the upstream side of the flow line whereby said pressure constantly urges the valve element toward an open position, a pressure-responsive member connected with the valve element and having an area larger than the area of the valve element with one side thereof constantly exposed to the upstream pressure in the flow line, whereby the valve element is held in a closed position by said member, means actuated by the upstream pressure in the line when said pressure exceeds a predetermined amount for equalizing the pressures across the pressure-responsive member, whereby the main valve element may be opened by the upstream pressure acting thereon, a normally closed vent valve communicating with one side of the pressure-responsive member, and means exposed to and actuated by the upstream pressure in the line and having connection with the vent valve for opening said vent valve when the upstream pressure falls below a predetermined point.

16. A pressure regulating apparatus for regulating the pressure of a fluid within a flow conductor including, a main valve element connected in the flow conductor for controlling flow therethrough and having one side exposed to upstream pressure in the conductor which urges the valve toward an open position, a housing, a pressure-responsive member mounted in the housing and having an area larger than the area of the valve element, said member being connected with the main valve element and movable in accordance with pressures acting on opposite sides thereof for controlling operation of said valve element, one side of said pressure-responsive member being exposed to the same pressure at all times, means for establishing communication between the upstream side of the flow conductor and that side of the pressure-responsive member opposite the side exposed to the same pressure at all times, a valve means disposed in the upper portion of the housing and mounted in the communication-establishing means for controlling flow of the pressure fluid from the upstream side of the conductor to that side of the pressure-responsive member opposite to the side exposed to the same pressure at all times, a second valve means controlling the venting to atmosphere of the communication-establishing means whereby when said second valve means is open that side of the pressure-responsive member to which fluid pressure may be directed past the first valve means is vented to atmosphere, a pressure-responsive actuator also mounted in the upper portion of the housing common to both valve means and exposed to the upstream pressure in the conductor and actuated by variations in said pressure, means for connecting the actuator to both valve means to maintain both valve means closed when the pressure fluid within the conductor is within a predetermined selected range, said actuator opening the first valve means when the pressure of the fluid in the conductor deviates from the selected pressure range in one direction to direct an additional pressure to the pressure-responsive member, said actuator opening the second valve means when the pressure in the conductor deviates from the selected range in a direction opposite to that which operated the first valve means to thereby decrease the pressure acting upon the pressure-responsive member.

17. A pressure regulating apparatus for regulating the pressure of a fluid within a flow line including, a main valve element connected in said flow line for controlling flow therethrough, said valve element having one side exposed to the pressure in the upstream side of the flow line whereby said pressure constantly urges the valve element toward an open position, a pressure-responsive member connected with the valve element and having an area larger than the area of the valve element, one side of said member being exposed to a substantially constant pressure, conducting means extending from the flow line to that side of the pressure-responsive member opposite the side exposed to a constant pressure, whereby this pressure may be directed against the member to control actuation of the main valve, a first valve means in the conducting means adapted when open to direct pressure from the line to said pressure-responsive member, a vent valve means communicating with the conducting means adapted when open to vent the pressure acting upon that side of the pressure-responsive member which is opposite to the side exposed to a constant pressure, and a common actuator adjacent to and directly connected with both valve means and exposed to and actuated by the variations in the upstream pressure in the flow line, said actuator holding both valve means closed when the pressure in the flow line is within a predetermined pressure range and opening the first valve means when said pressure deviates from the selected range in one direction, said actuator opening the second valve means when the pressure in the flow line deviates from said selected range in an opposite direction.

18. A pressure regulating apparatus for regulating the pressure of a fluid within a flow conductor including, a main valve element connected in the flow conductor for controlling flow therethrough, said valve element having one side exposed to the pressure in the upstream side of the flow conductor whereby said pressure constantly urges the valve toward an open position, a housing, a pressure-responsive member within the housing and connected with the main valve element, said pressure-responsive member having an area larger than the area of the valve element and movable in accordance with pressures acting on opposite sides thereof for controlling operation of said valve element, one side of said pressure-responsive member being exposed to the same pressure at all times, means for establishing communication between the flow conductor and that side of the pressure-responsive member opposite the side exposed to the same pressure at all times, a valve means in the communication-establishing means for controlling flow of the pressure fluid from the conductor to that side of the pressure-responsive member opposite to the side exposed to the same pressure at all times, a second valve means for controlling the release of pressure from that side of the pressure-responsive member to which fluid pressure may be directed past the first valve means, a pressure-responsive actuator adjacent the valve means and common to both valve means and exposed to the fluid pressure in the conductor and actuated by variations in said pressure, means for connecting the actuator to both valve means to maintain both valve means closed when the pressure fluid within the conductor is within a predetermined selected range, said actuator opening the first valve means when the pressure of the fluid in the conductor deviates from the selected pressure range in one direction to direct an additional pressure to the pressure-responsive member, said actuator opening the second valve means when the pressure in the conductor deviates from the selected range in a direction opposite to that which operated the first valve means to thereby decrease the pressure acting upon the pressure-responsive member.

19. A pressure regulating apparatus for regulating the pressure of a fluid within a flow line including, a main valve element in said line for controlling flow therethrough, a main diaphragm connected with the valve element and having one side constantly exposed to the upstream pressure in the flow line and normally holding the main valve element closed, means establishing communication between opposite sides of the diaphragm, a pilot valve mechanism disposed in said communicating means for controlling flow from that side of the diaphragm which is constantly exposed to the upstream pressure and the opposite side of said diaphragm, said pilot valve mechanism being actuated by the upstream pressure in the flow line, whereby the pressures across the diaphragm are balanced or unbalanced and the main valve element is moved toward an open or closed position in accordance with the upstream pressure in said flow line, said pilot valve mechanism comprising an actuating pressure-responsive member exposed to the upstream pressure, a valve plunger located axially of the member and having said member movable independently thereof when the pressure acting on said member exceeds a predetermined point, and valve means associated with said plunger and said pressure-responsive member for opening the communicating means between opposite sides of the main diaphragm.

20. A pressure regulating apparatus for regulating the pressure of a fluid within a flow line including, a main valve element in said line for controlling flow therethrough, a main diaphragm connected with the valve element and having one side constantly exposed to the upstream pressure in the flow line and normally holding the main valve element closed, means establishing communication between opposite sides of the diaphragm, a pilot valve mechanism disposed in said communicating means for controlling flow from that side of the diaphragm which is constantly exposed to the upstream pressure and the opposite side of said diaphragm, said pilot valve mechanism being actuated by the upstream pressure in the flow line, whereby the pressures across the diaphragm are balanced or unbalanced and the main valve element is moved toward an open or closed position in accordance with the upstream pressure in said flow line, said pilot valve mechanism comprising an actuating pressure-responsive member exposed to the upstream pressure, a valve plunger located axially of the member and having said member movable independently thereof when the pressure acting on said member exceeds a predetermined point, valve means associated with said plunger and said pressure-responsive member for opening the communicating means between opposite sides of the main diaphragm, and a second valve means controlled in its operation by the movement of the plunger for venting the communicating means when the first valve means is closed by the pressure acting upon the pressure-responsive member falling below a predetermined point.

ASBURY S. PARKS.

REFERENCES CITED

The following references are of record in the file of this patent:

UNITED STATES PATENTS

| Number | Name | Date |
|---|---|---|
| 919,300 | Anderson | Apr. 27, 1909 |
| 934,083 | Mills | Sept. 14, 1909 |